US005711506A

United States Patent [19]

Stillwagon

[11] Patent Number: 5,711,506

[45] Date of Patent: Jan. 27, 1998

[54] CYLINDER LOCK WITH GUIDE DEFLECTION AND FORTIFIED WING SYSTEMS

[75] Inventor: Woodrow C. Stillwagon, Atlanta, Ga.

[73] Assignee: Star Lock Systems, Inc., Hilliard, Ohio

[21] Appl. No.: 700,056

[22] Filed: Aug. 20, 1996

Related U.S. Application Data

[63] Continuation of Ser. No. 183,074, Jan. 18, 1994, abandoned.

[51] Int. Cl.$^6$ .......... B60R 25/02

[52] U.S. Cl. .......... 70/208; 70/360; 70/417

[58] Field of Search .......... 70/208, 360, 367, 70/369–373, 375–377, 379 R, 380, 417–421, 423, 424, 453, 454, 492, DIG. 31

[56] References Cited

U.S. PATENT DOCUMENTS

| | | | |
|---|---|---|---|
| 1,422,497 | 7/1922 | Thompson | 70/417 |
| 1,432,326 | 10/1922 | Freysinger | 70/417 |
| 1,484,757 | 2/1924 | Coney | 70/417 |
| 1,645,006 | 10/1927 | Jacobi | 70/417 X |
| 1,686,665 | 10/1928 | Jacobi | 70/417 X |
| 2,023,208 | 12/1935 | Olson | 70/360 |
| 2,070,276 | 2/1937 | Jacobi | 70/417 |
| 3,089,330 | 5/1963 | Kerr | 70/208 X |
| 3,130,573 | 4/1964 | Hines | 70/417 |
| 3,234,765 | 2/1966 | Kerr | 70/208 |
| 3,399,555 | 9/1968 | Gray et al. | 70/369 |
| 3,438,227 | 4/1969 | Wolniak | 70/208 |
| 4,539,828 | 9/1985 | Telky | 70/369 |
| 4,552,001 | 11/1985 | Roop | 70/208 |
| 4,760,721 | 8/1988 | Steinbach | 70/208 |
| 5,010,745 | 4/1991 | Hall et al. | 70/32 |
| 5,022,243 | 6/1991 | Embry et al. | 70/34 |
| 5,212,972 | 5/1993 | Kincaid et al. | 70/208 |
| 5,265,453 | 11/1993 | Konii et al. | 70/360 X |
| 5,272,894 | 12/1993 | Stillwagon et al. | 70/208 |

FOREIGN PATENT DOCUMENTS

| | | | |
|---|---|---|---|
| 2303927 | 10/1976 | France | 70/417 |
| 2388966 | 12/1978 | France | 70/417 |

OTHER PUBLICATIONS

Paperwork disclosing a Medico Security Switch Lock.

Description of Prior Cylinder Locks. Said Description Provided by Applicant and Incorporated into Information Disclosure and Statement filed Herewith.

*Primary Examiner*—Suzanne Dino
*Attorney, Agent, or Firm*—Isaf, Vaughan & Kerr; Louis T. Isaf

[57] ABSTRACT

A key-operated cylinder lock including a cylinder lock housing, a cylinder lock core assembly rotatably located within the housing, and an outwardly biased, radially movable lock bolt. The cylinder lock housing includes a cylindrical side wall encircling an axial cavity for receipt of the cylinder lock core assembly and a pair of opposed axially extending arcuate lugs extending inwardly from the cylindrical side wall into the axial cavity. The cylinder lock core assembly includes a core insert retaining several hardened key guides and biased tumblers. The core insert rotates within the cylinder lock housing to transfer force between a key inserted into a key entryway and an eccentric stud riding within a cam cavity defined within the lock bolt to effect radial movement of the lock bolt in conjunction with rotational movement of the key. The core insert includes a pair of opposing fortified wings for abutting the arcuate lugs of the cylinder lock housing to resist relative axial movement between the core insert and the cylinder lock housing. A radially extending hardened cylindrical pin is embedded within the core insert behind the hardened guides and in front of the eccentric stud to deflect an intrusive device away from the eccentric stud and into the hardened guides.

56 Claims, 10 Drawing Sheets

CYLINDER LOCK WITH GUIDE DEFLECTION AND FORTIFIED WING SYSTEMS

This application is a continuation of application Ser. No. 08/183,074, filed 01/18/94, now abandoned.

BACKGROUND OF THE INVENTION

The present invention relates generally to the field of locks, and more specifically, to the field of cylindrical locks for vending machines and other secure environments.

For many years, and to this day, hordes of vandals continue to attack the millions of vending machines spread throughout the world. Thieves frequently gain access to the internals of vending machines and steal money and other precious commodities. Due to inflation and an increased number of vending machines with integral dollar bill changers, it has become more common for large amounts of money to be contained within vending machines. Accordingly, it is thought that millions of dollars and millions of dollars worth of goods are stolen from vending machines annually. In response, the vending industry continues to search for methods to better secure vending machines.

One area of vending machine vulnerability has been the latching devices used in many currently installed vending machines. One very common latching device is known as a T-handle assembly. This type of latching system typically includes a T-handle housing connected to the vending machine door, a T-handle nested therein, a key-operated cylinder lock contained within the T-handle, a post member connected to the T-handle, and a receiving assembly connected to the vending machine frame for receiving the post member. In unlatching a typical T-handle assembly, rotation of a key causes a lock bolt of the cylinder lock to retract, allowing a spring to extend a nested T-handle from within a T-handle housing. Upon extension, the T-handle may be rotated by the operator to release the post member from the receiving assembly, thus allowing the door to be opened. The post member and receiving assembly included in many of the common T-handle systems include a post member with a threaded distal end and a receiving assembly which includes a correspondingly threaded nut. Several examples of this conventional type of T-handle assembly are disclosed in U.S. Pat. Nos. 4,552,001 and 4,760,721. Other common T-handle systems, such as those disclosed in U.S. Pat. Nos. 3,234,765 and 3,438,227, utilize a cam-type post member along with a locking cam and a locking shoulder connected to the door frame. In addition, the inventor of the present invention has previously participated in inventing a variety of different T-handle latching systems, including devices disclosed in U.S. Pat. Nos. 5,022,243 and 5,272,894.

One typical method used by thieves to attack and defeat a T-handle latching system includes drilling or screwing into the cylinder lock. The makers of cylinder locks have made many attempts over the past decades to limit the destructive effects of such invasive devices. One method includes introducing various hardened elements, such as key guides, within the cylinder locks to prevent intrusion by a drill or screw. Unfortunately, this method has, at best, only proven useful in slowing the destructive process. Other methods have included introducing abutting lugs, or wings, within the cylinder lock to prevent the cylinder lock core from being pulled from the cylinder lock housing. Sadly, these methods are also easily overcome by the stronger and more experienced thieves.

There is, therefore, a need in the industry for an apparatus which addresses these and other related, and unrelated, problems.

SUMMARY OF THE INVENTION

Briefly described, the present invention includes, in its most preferred embodiment, a key-operated cylinder lock which includes a cylinder lock housing, a cylinder lock core assembly rotatably located within the housing, and a radially movable lock bolt biased toward engaging a T-handle and a T-handle housing of a vending machine T-handle assembly. The cylinder lock housing is hollow and includes a cylindrical side wall and a transverse back wall. The cylindrical side wall encircles an axial cavity for receipt of the cylinder lock core assembly and defines a radial aperture normally occupied by the lock bolt extending radially from the axial cavity through the side wall. A pair of opposed axially extending arcuate lugs extend inwardly from the cylindrical side wall into the axial cavity.

The cylinder lock core assembly includes a core insert retaining several hardened key guides and biased tumblers. The core insert rotates within the cylinder lock housing to transfer force between a key inserted into a key entryway and an eccentric stud riding within a cam cavity defined within the lock bolt to effect radial movement of the lock bolt in conjunction with rotational movement of the key. The core insert includes a pair of opposing fortified wings for, when the cylinder lock is in a locked condition, abutting the arcuate lugs of the cylinder lock housing to comprise a fortified wing system which provides improved resistance against relative axial movement between the core insert and the cylinder lock housing. According to the preferred embodiment of the present invention, each wing extends at least twice as far axially as it extends radially and is supported by a rearwardly extending support surface.

In addition, the cylinder lock core assembly includes a radially extending hardened cylindrical pin embedded within the core insert behind the hardened guides and in front of the eccentric stud. As an intrusive destructive device such as a drill bit bores into the cylinder lock core assembly to destroy or weaken the eccentric stud, the cylindrical pin deflects the device away from the eccentric stud and into the hardened guides, often resulting in breaking the destructive device while preserving the integrity of the cylinder lock. Additionally, although the cylinder lock may no longer unlock properly, it has been discovered that in addition to an increased likelihood that the integrity of the cylinder lock will not be compromised by the broken device, the overall integrity of the lock will likely be increased when broken pieces of a destructive device become embedded within the cylinder lock since such pieces are potentially constructed of even harder materials.

It is therefore an object of the present invention to provide an improved cylinder lock which provides greater security than previous cylinder locks.

Another object of the present invention is to provide a cylinder lock with a fortified wing system.

Another object of the present invention is to provide a cylinder lock which includes a cylinder lock housing with opposing lugs and a cylinder lock core insert with opposing fortified wings for abutting the opposing lugs to prevent relative axial motion between the cylinder lock housing and the cylinder lock core insert while the cylinder lock is in a locked position.

Yet another object of the present invention is to provide a cylinder lock with a guide deflection system.

Yet another object of the present invention is to provide a cylinder lock with a cylinder core assembly which includes a plurality of hardened guides and a radial cylindrical deflection pin which deflects boring devices into the hardened guides.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
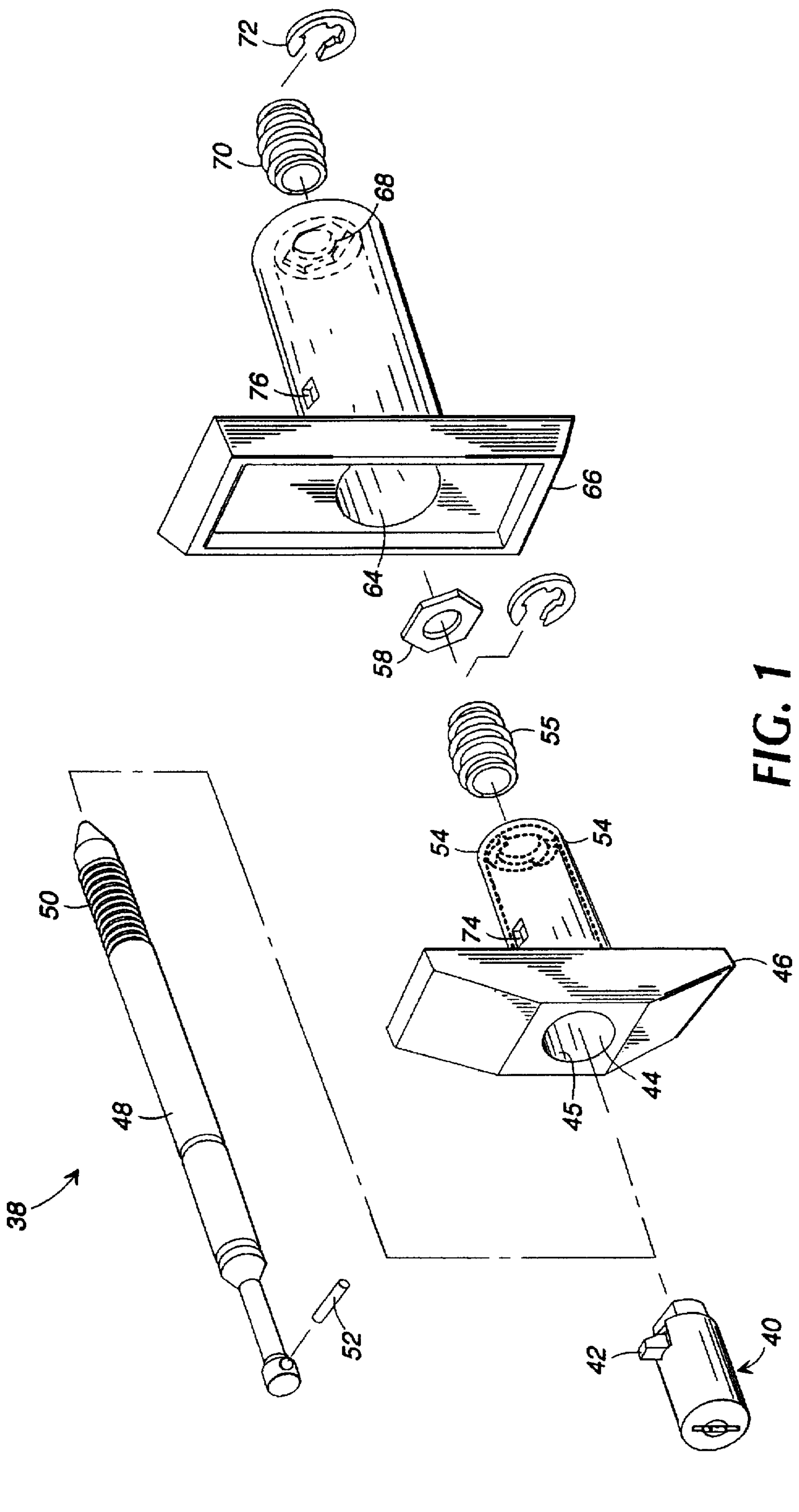
FIG. 1 is an exploded perspective view of a T-handle assembly including a cylinder lock with guide deflection and fortified wing systems, in accordance with the preferred embodiment of the present invention.

Referring now in greater detail to the drawings in which like numerals represent like components throughout the several views, FIG. 1 shows an exploded perspective view of a T-handle assembly 38 including a cylinder lock 40 with a lock bolt 42 and guide deflection and fortified wing systems, in accordance with the preferred embodiment of the present invention. Since the remaining elements of the T-handle assembly 38 (excluding the cylinder lock 40) are conventional T-handle assembly elements, the following information regarding the construction and operation of the T-handle assembly 38 is considered largely known and understood by those reasonably skilled in the lock industry.

Figure 2:
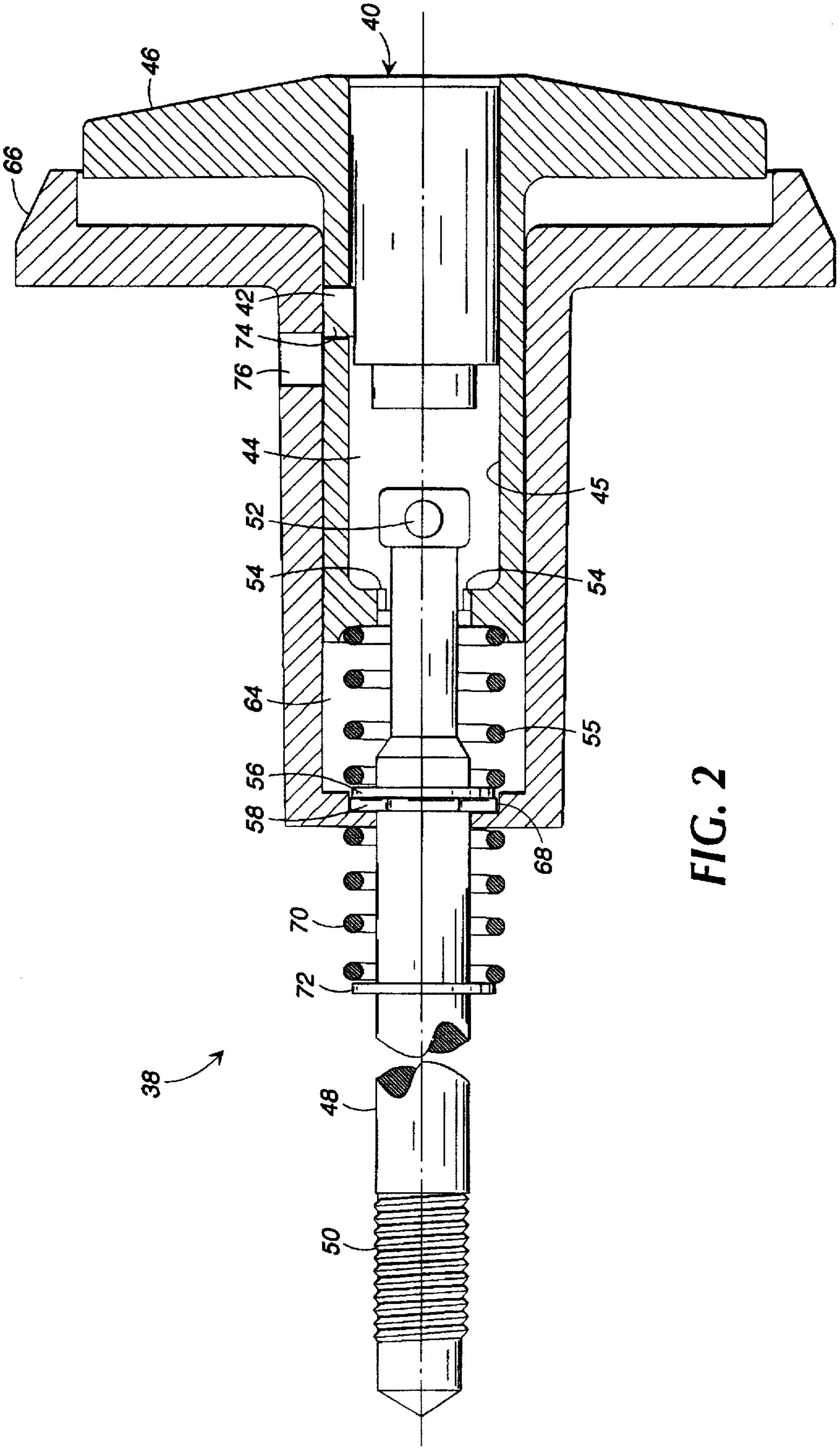
FIG. 2 is a side cross-sectional view of the T-handle assembly of FIG. 1 shown in an intermediate position.

Referring also to FIG. 2, which shows a side cross-sectional view of the T-handle assembly 38 of FIG. 1 shown in an intermediate position, the T-handle assembly 38 further includes a T-handle 46, a T-handle housing 66, and a post 48. The T-handle 46 includes a T-handle cavity wall 45 defining a T-handle cavity 44 for receiving the post 48. The post 48 includes a threaded portion 50 and a post pin 52 for interaction according the conventional lost motion method with a pair of T-handle lugs 54 included within the T-handle cavity 44 of the T-handle 46. A handle spring 55, an E-ring 56, and a hex washer 58 encircle the post 48 behind the T-handle 46. The T-handle housing 66 defines a T-handle housing cavity 64 and a hex recess 68 which house the previously discussed elements of the T-handle assembly 38. A shock spring 70 and an E-ring 72 encircle the post 48 behind the T-handle housing 66. The T-handle 46 further defines a T-handle bolt aperture 74, and the T-handle housing 66 further defines a T-handle housing bolt aperture 76.

Briefly described, operation of the T-handle assembly 38 in conjunction with a vending machine (not shown) begins after attaching the T-handle housing 66 to a vending machine door and attaching a correspondingly threaded receiving assembly (not shown) to a vending machine frame to receive the post 48. In a latched position, the post 48 threadingly engages the receiving assembly (not shown), the handle spring 55 is compressed, the T-handle 46 is fully inserted into the T-handle housing 66, and the lock bolt 42 is extended to occupy both the T-handle bolt aperture 74 and the T-handle housing bolt aperture 76. As the cylinder lock 40 is unlocked, the lock bolt 42 retracts to a height just below that shown in FIG. 2 to allow the T-handle 46 to be forced to protrude out of the T-handle housing 66 by the handle spring 55 to a position past that shown in FIG. 2. In such an extended position, the T-handle lugs 54 engage the post pin 52 so that the post 48 can be rotated and unscrewed as the T-handle 46 is rotated. The lock bolt 42 can also be manually depressed further for removal of the cylinder lock 40 from the T-handle cavity 44.

To return the T-handle assembly 38 to the latched position, the cylinder lock 40 is locked so that the lock bolt 42 is free to be fully extended and the T-handle 46 is rotated to thread the post 48 back into the receiving assembly. The T-handle 46 is then pushed into the T-handle housing 66 to cause the lock bolt 42 to first retract inward until the T-handle bolt aperture 74 becomes aligned with the T-handle housing bolt aperture 76, at which time the lock bolt 42 returns into the T-handle housing bolt aperture 76. It can easily be seen that the T-handle assembly 38 would be disabled if the lock bolt 42 were depressed or allowed to be ejected, such as through drilling through the cylinder lock 40 into the lock bolt 42 or the support and/or retention mechanisms for the lock bolt 42.

Figure 3:
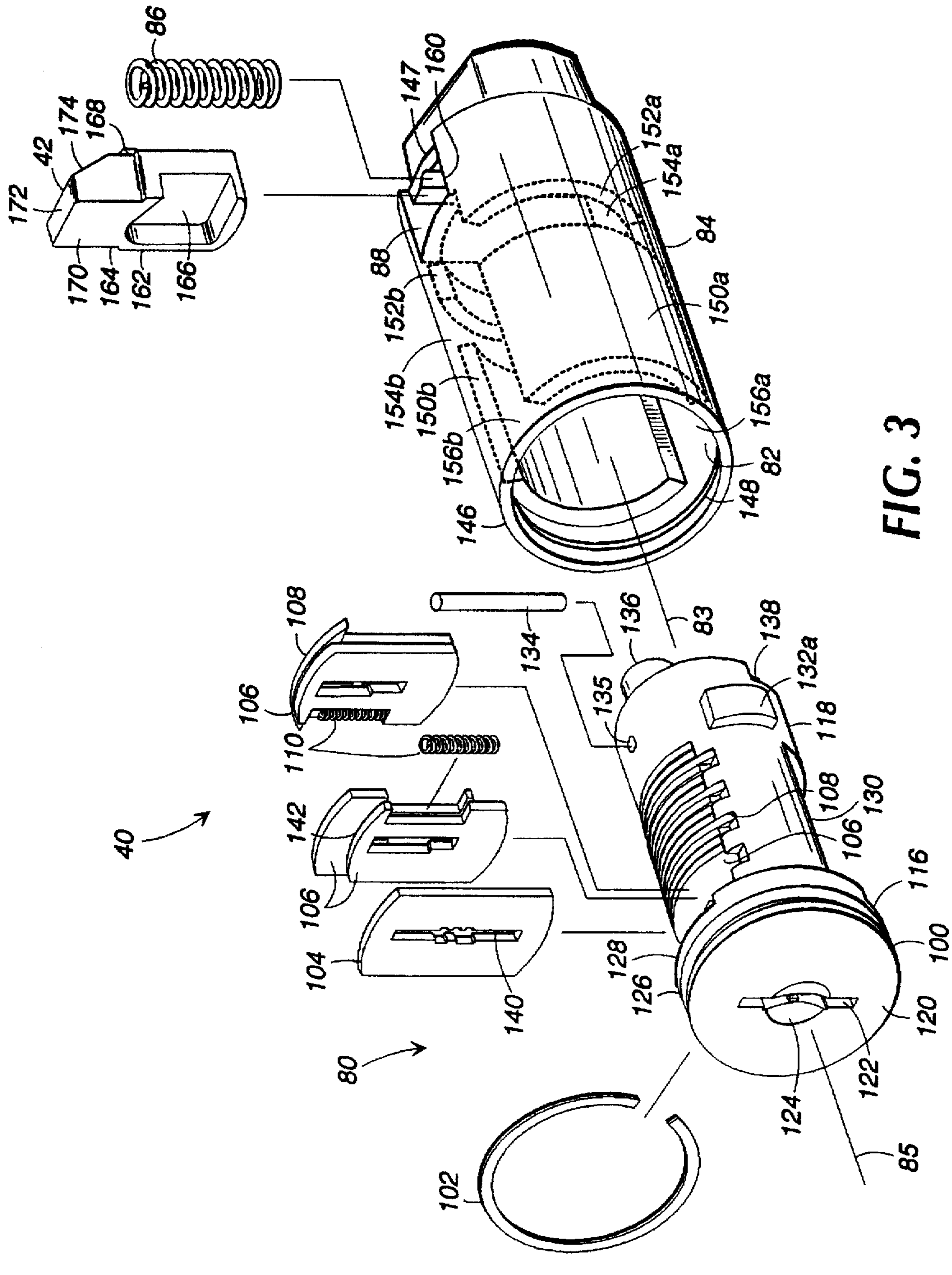
FIG. 3 is an exploded perspective view of the cylinder lock of FIG. 1.
Figure 4:
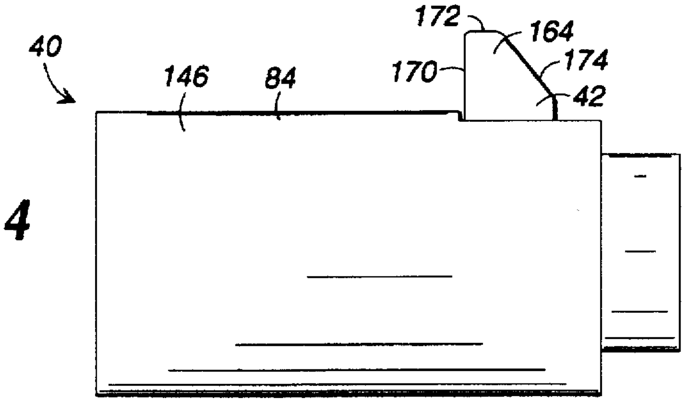
FIG. 4 is a side elevational view of the cylinder lock of FIG. 1.

Refer now to FIG. 3 which shows an exploded perspective view of the cylinder lock 40. A cylinder lock core assembly 80 normally occupies an axial cavity 82 with a cavity axis 83 defined by a cylinder lock housing 84 so that an insert axis 85 defined at the center of the core assembly 80 is collinear with the cavity axis 83. A bolt spring 86 biases the lock bolt 42 outward through a radial aperture 88 extending through the cylinder lock housing 84. The core assembly 80 includes a core insert 100 which is secured, in a limited sense, within the axial cavity 82 by an insert snap ring 102. The core insert 100 also houses and retains a head key guide 104, fourteen tumblers 106, and four main key guides 108. Operation of the tumblers 106 and guides 104, 106 in conjunction with nine tumbler springs 110 is discussed below.

The core insert 100 includes an insert head 116 and an insert body 118. The insert head 116 includes an insert face 120 and defines a head keyway 122 with an entryway recess 124. The insert head 116 further defines a head ring groove 126 for holding the insert snap ring 102 and a head guide slot 128 for holding the head key guide 104. The head guide slot 128 is part of a larger tumbler passage 130 which also holds the tumblers 106, main key guides 108, and tumbler springs 110. The core insert 100 also includes a pair of oppositely positioned wings 132*a* and 132*b* (hidden from view). A deflection pin 134 is embedded within a pin cavity 135 defined in the insert body 118 behind the tumbler passage 130 in front of an axially protruding stud 136. An arcuate rotation groove 138 is defined around a bottom rear end of the insert body 118. The head guide 104 defines a head guide keyway which resembles the head keyway 122, while the tumblers 106 define a variety of tumbler keyways 142.

The cylinder lock housing 84 includes a cylindrical housing side wall 146 which is backed at a rear end by a housing back wall 147. The axial cavity 82 and radial aperture 88 are defined by the housing side wall 146 and the housing back wall 147. An annular housing ring groove 148 is defined inside the housing side wall 146 at a front end of the cylinder housing 84. A pair of arcuate, opposing forward lugs 150*a,b* and a pair of arcuate, opposing rear lugs 152*a,b* extend into the axial cavity 82 from the housing side wall 146. The lugs 150*a,b* and 152*a,b* are arranged to define a pair of horizontally opposing, arcuately extending wing channels 154*a,b* and a pair of vertically opposing, axially extending tumbler channels 156*a,b*. A bolt spring groove 160 is defined by the housing back wall 147 for receipt of the bolt spring 86. The lock bolt 42 includes a bolt base 162 and a bolt extension 164. The bolt base 162 defines a stud cavity 166 for receiving the stud 136 of the core insert 100. A bolt spring appendage 168 protrudes from the bolt base 162 for interaction with the bolt spring 86. The bolt extension 164 includes an extension front face 170 for abutting one side of the T-handle housing bolt aperture 76 to prevent axial movement between the T-handle 46 and the T-handle housing 66, an extension top surface 172, and an extension rear face 174 which is slanted for being temporarily depressed by the T-handle housing 66 during insertion of the T-handle 46 into the T-handle housing 66.

With a key inserted into an assembled core assembly 80, the tumbler springs 110 are compressed and the tumblers 106 are uniformly depressed to positions even with the insert body 118. The insert snap ring 102 is compressed, and the core assembly 80 is rotated from the position shown in FIG. 3 before being inserted into the axial cavity 82 so that the wings 132*a,b* slide along the tumbler channels 156*a,b* until the wings 132*a,b* reach the wing channels 154*a,b*, the insert snap ring 102 snaps into the housing ring groove 148, and the stud 136 enters the stud cavity 166 of the lock bolt 42 The core assembly 80 is then rotated to return to the orientation shown in FIG. 3 so that the wings 132*a,b* are within wing channels 154*a,b* and the tumblers 106 are immediately below and above the tumbler channels 156*a,b*. In this locked orientation, the lock bolt 42 is fully extended, but capable of being depressed by overcoming the bolt spring 86. When the core assembly 80 is rotated back around, interaction between the stud 136 and bolt 42 overcomes the bolt spring 86 to retract the lock bolt 42. When a key is removed from the cylinder lock 40 while in a locked position, the tumblers 106 are free to move outward into the tumbler channels 156*a,b* under force of the tumbler springs 110 pushing against other tumblers 106 and the main guides 108. While the tumblers 106 occupy the tumbler channels 156*a,b*, the insert assembly 80 cannot be rotated to retract the lock bolt 42. In addition, the wings 132*a,b* form part of a fortified wing system which, as discussed below, provides additional protection against the core assembly 80 being pulled from the lock housing 84 when the wings 132*a,b* abut the forward lugs 150*a,b*. When pulled against the forward lugs 150*a,b*, (or pushed against the rear lugs 152*a,b* ) it is thought that the lock housing 84 will, if anything, spread and deform outward to become wedged against the T-handle 46 to provide additional resistance against removal. Also, the deflection pin 134 serves to deflect an often weaker side portion of an intrusive device, such as a drill bit, into the teeth of the hardened guides 108, 104 often resulting in breakage of the intrusive device.

Figure 8:
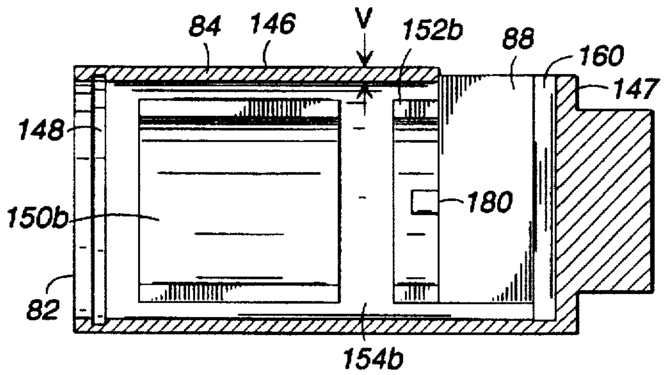
FIG. 8 is a side cross-sectional view of the lock housing of FIG. 1.
Figure 9:
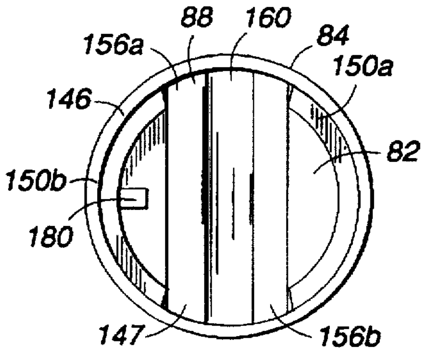
FIG. 9 is a front elevational view of the lock housing of FIG. 1.

Refer now to FIGS. 4–7 which show side elevational, top plan, front elevational, and rear elevational views, respectively, of the cylinder lock 40. The housing side wall 146 and housing back wall 147 of the cylinder lock housing 84 are shown from various angles. The lock bolt 42 is shown protruding from the lock housing 84, and the insert face 120 of the insert head 116 of the core assembly 80 is shown with the head keyway 122 and entryway recess 124. FIGS. 8 and 9 show side cross-sectional and front elevational views, respectively, of the cylinder lock housing 84. The front and rear lugs 150*b* and 152*b* are shown defining the wing channel 154*b* (FIG. 8), while the front lugs 150*a,b* are shown defining the tumbler channels 156*a,b*. The radial aperture 88 and bolt spring groove 160 are shown in front of the rear wall 147. In addition, a rotation stud 180 is shown connected to the rear lug 152*b* for riding within the rotation groove 138 of the core insert 100 (FIG. 3) to limit rotation of the core insert 100. Also, in accordance with the preferred embodiment of the present invention, one example of an acceptable side wall thickness at the wing channels 154, as indicated by dimension "V", is 1.3 mm. This extra thickness of the housing side wall 146 is one component of the fortified wing system of the present invention, with the dimensions and locations of the wings 132*a,b* (FIGS. 11–13) and the shapes and dimensions of adjoining surfaces forming other components. It should be understood, however, that alternate embodiments of the present invention include fortified wing systems which include subsets and variations of the components disclosed in connection with the preferred embodiment of the present invention.

Figure 10:
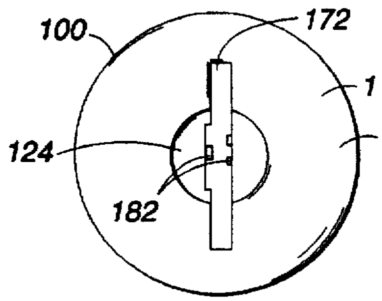
FIG. 10 is a front elevational view of the core insert of FIG. 3.
Figure 11:
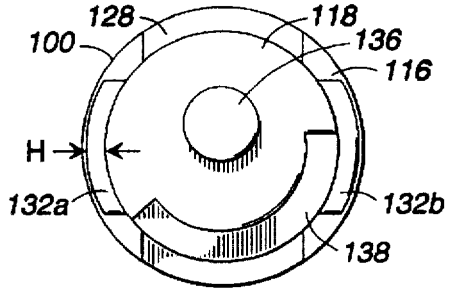
FIG. 11 is a rear elevational view of the core insert of FIG. 3.
Figure 12:
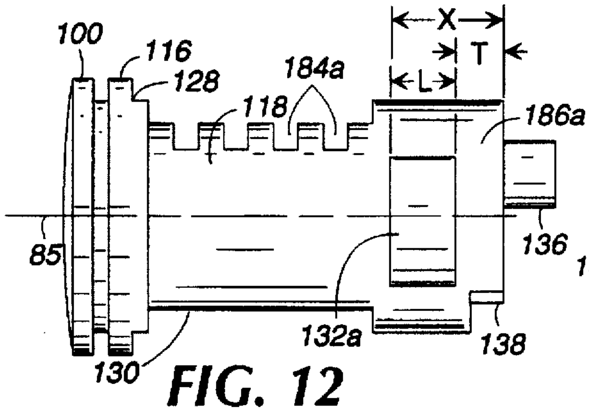
FIG. 12 is a right side elevational view of the core insert of FIG. 3.
Figure 18:
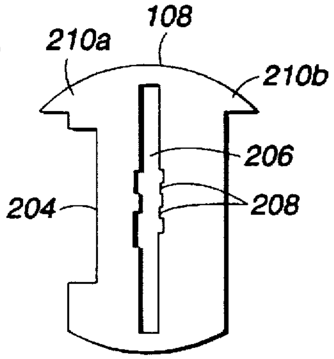
FIG. 18 is a front elevational view of a key guide of FIG. 3.

FIGS. 10–15 show front elevational, rear elevational, right side elevational, left side elevational, top plan, and bottom plan views, respectively, of the core insert 100 in accordance with the preferred embodiment of the present invention. In FIG. 10, the insert head 116 is shown including several insert head teeth 182 extending into the head keyway 122 of the core insert 100. FIG. 11 shows the arcuate shapes of the wings 132*a,b* and the rotation groove 138. According to the preferred embodiment of the present invention, one example of an acceptable radial height of each of the wings 132*a,b*, as indicated by the dimension "H" in FIG. 11, is 0.7 mm. According to FIGS. 12 and 13, the core insert 100 also defines guide grooves 184*a,b* extending into the tumbler passage 130 to receive and provide stability to the main guides 108 (FIG. 18). According to the preferred embodiment of the present invention, one example of an acceptable axial length of each of the identical wings 132*a,b*, as indicated by the dimension "L" in FIG. 12, is 3.7 mm. Thus, the wings 132*a,b* are at least twice as long as they are high. In addition, though not marked in the drawings, the overall axial length of the core insert 100 from the most forward point on the insert face 120 to the rear surface on the stud 136 is 30 mm; the axial length of the tumbler passage 130, including the head guide slot 128, is 14.6 mm; and the diameter of the core body 118 between wing support surfaces 186*a,b* is 14.2 mm. Also, the overall length of the lock housing 84 is 40.9 mm.

Figure 13:
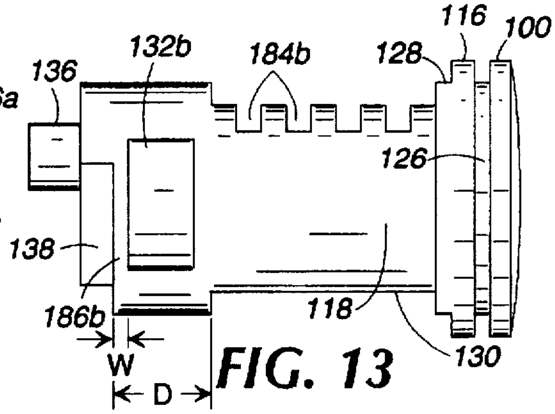
FIG. 13 is a left side elevational view of the core insert of FIG. 3.

In FIG. 12, an area behind the wing 132*a* is indicated as a wing support surface 186*a*. This area extends from the wing 132*a* to a rear end of the insert body 118 and is positioned as equally far from the insert axis 85 of the core insert 100 as the surface immediately preceding the wing 132*a* to provide additional fortification to the wing 132*a*. Accordingly, this wing support surface 186*a* is another component of the fortified wing system of the preferred embodiment of the present invention. According to the preferred embodiment of the present invention, one example of an acceptable axial length of the wing support surface 186*a* as indicated by the dimension "T" in FIG. 12, is 3 mm. Referring now to FIG. 13, a wing support surface 186*b* is defined between the wing 132*b* and the rotation groove 138. Like the wing support surface 186*a*, the wing support surface 186*b* is also positioned equally as far from the insert axis 85 of the core insert 100 as the surface immediately preceding the wing 132*b* and forms another component of the fortified wing system of the preferred embodiment of the present invention. According to the preferred embodiment of the present invention, one example of an acceptable axial length of the wing support surface 186*b*, as indicated by the dimension "W" in FIG. 13, is 1.2 mm.

Thus, it is clear that, according to the preferred embodiment, in the given example, the combined axial length "D") of the wing 132*b* and support area 186*b* is 4.9mm, and the combined axial length ("X") of the wing 132*a* and support area 186*a* is 6.7 mm (see FIGS. 10 and 11).

Figure 14:
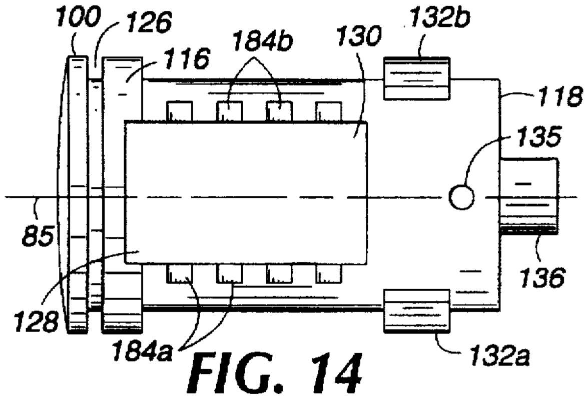
FIG. 14 is a top plan view of the core insert of FIG. 3.
Figure 15:
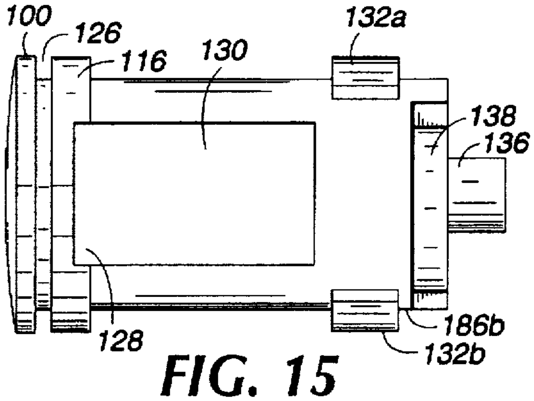
FIG. 15 is a bottom plan view of the core insert of FIG. 3.
Figure 16:
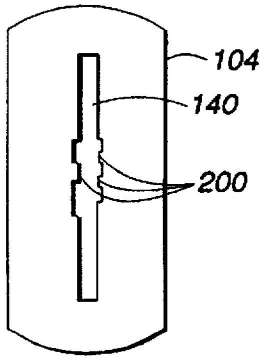
FIG. 16 is a front elevational view of the head key guide of FIG. 3.
Figure 17:
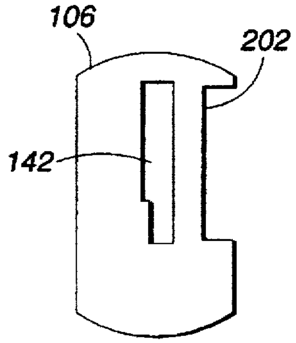
FIG. 17 is a front elevational view of a tumbler of FIG. 3.

Refer now to FIGS. 16–18 which show front views of the head key guide 104, a tumbler 106, and a main key guide 108, respectively. Several head guide teeth 200 are shown protruding into the head guide keyway 140 of the head key guide 104. The tumbler 106 is shown defining a tumbler spring channel 202 for receipt of a tumbler spring 110 (FIG. 3). The main key guide 108 defines a guide spring channel 204 for receipt of a tumbler spring 110. A main guide keyway 206 is also defined through the main key guide 108, several main guide teeth 208 extend into the main guide keyway 206. The main key guide 108 also includes a pair of guide arms 210*a,b* extending outward for supporting the main key guide within a pair of guide grooves 184*a,b* (FIG. 14).

The tumblers 106 are preferably constructed of a material much softer than the material of the head key guide 104 and main guides 108 since the tumblers 106 ride up and down (thus wearing) upon bitted surfaces of a key each time a key is inserted or removed, whereas the guides 104, 108 remain relatively stationary with respect to a key. An example of an acceptable construction material for the head key guide 104 and the main guides 108 is stainless steel, while an example of an acceptable construction material for the tumblers 106 is brass. In addition, an example of an acceptable construction material for the core insert 100 and lock housing 84 (FIG. 3) is D2632R ZAMAK #3 diecast zinc; an acceptable example of construction material for the deflection pin 134 is hardened tool steel; and an acceptable example of construction material for the lock bolt 42 is stainless steel. As discussed above, the deflection pin 134 (FIG. 3) deflects an invasive device into the teeth 200, 208 of the guides 104, 108 where the device is often broken. Thus, the hardened nature of the head key guide 104 and main key guides 108 form a component of the guide deflection system of the present invention.

Figure 5:
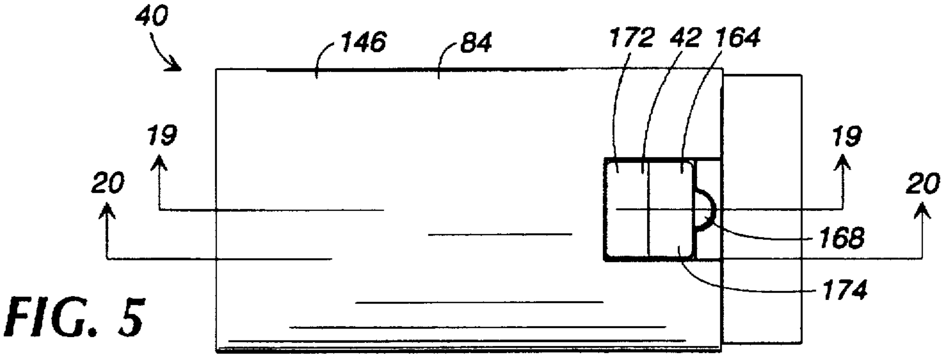
FIG. 5 is a top plan view of the cylinder lock of FIG. 1.
Figure 6:
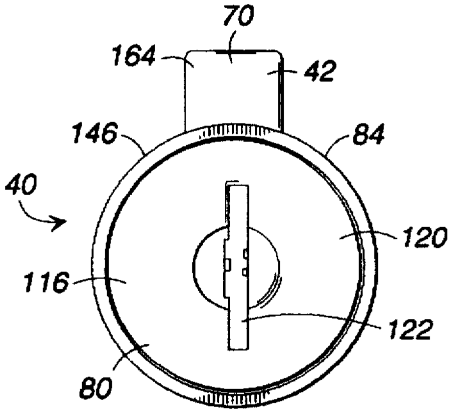
FIG. 6 is a front elevational view of the cylinder lock of FIG. 1.
Figure 7:
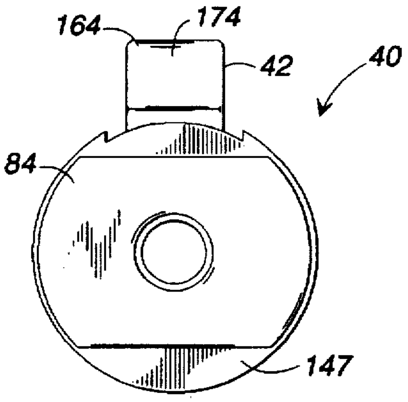
FIG. 7 is a rear elevational view of the cylinder lock of FIG. 1.
Figure 19:
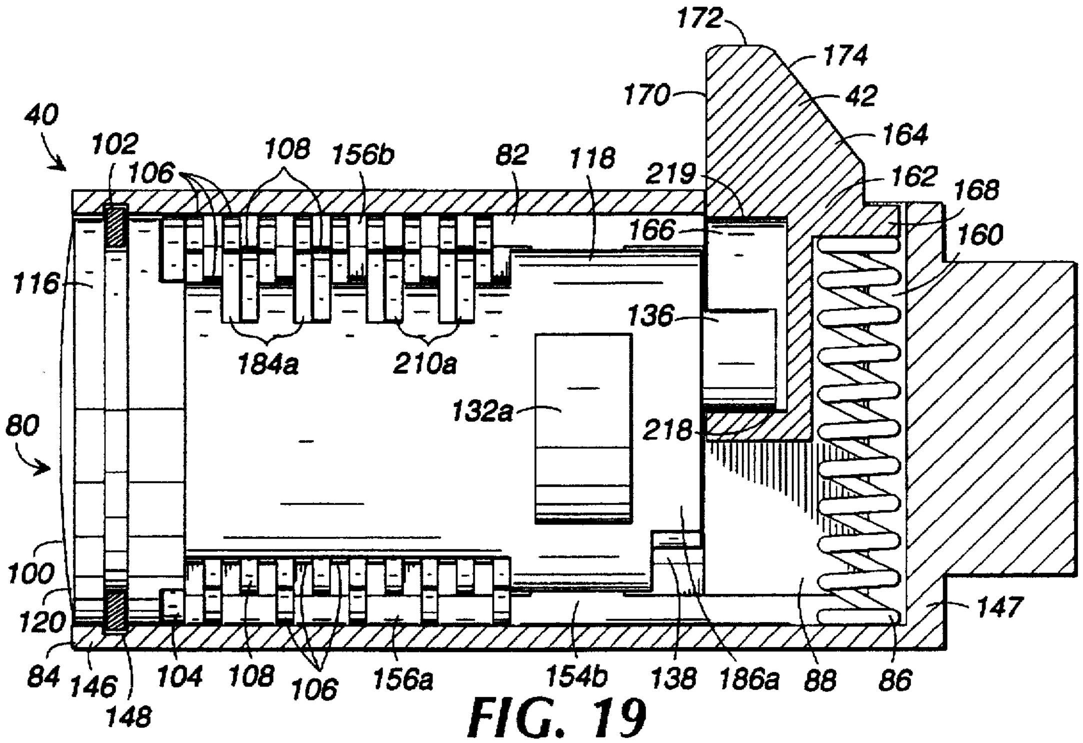
FIG. 19 is a side cross-sectional view of the cylinder lock taken along lines 19—19 of FIG. 5 with most of the core assembly shown solid.
Figure 20:
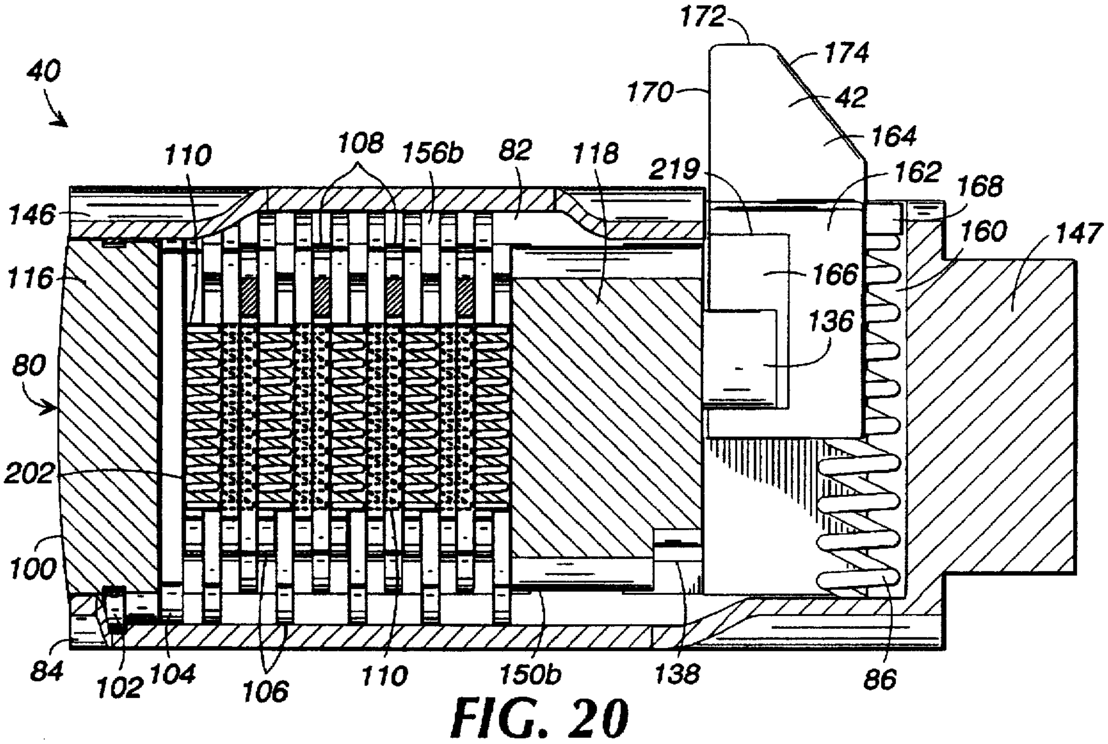
FIG. 20 is a side cross-sectional view of the cylinder lock taken along lines 20—20 of FIG. 5 with parts cut away for clarity.

Referring to FIG. 19, which shows a side cross-sectional view of the cylinder lock 40 taken along lines 19—19 of FIG. 5 with most of the core assembly 80 shown solid, the cylinder lock 40 is shown in a locked position with the tumblers 106 biased outward into the tumbler channels 156*a,b*. The lock bolt 42 is shown fully extended with the stud 136 resting on a bolt cavity bottom surface 218 to prevent the lock bolt 42 from exiting the radial aperture 88 under force of the bolt spring 86. The guide arms 210*a* of the main key guides 108 are shown resting within the guide grooves 184a of the insert body 118 of the core insert 100. FIG. 20 shows a side cross-sectional view of the cylinder lock 40 still in a locked position taken along lines 20—20 of FIG. 5 with parts cut away for clarity. In this view, several of the tumbler springs 1 10 are shown in solid, others shown in dotted lines, for biasing the tumblers 106 to the positions shown.

Figure 21:
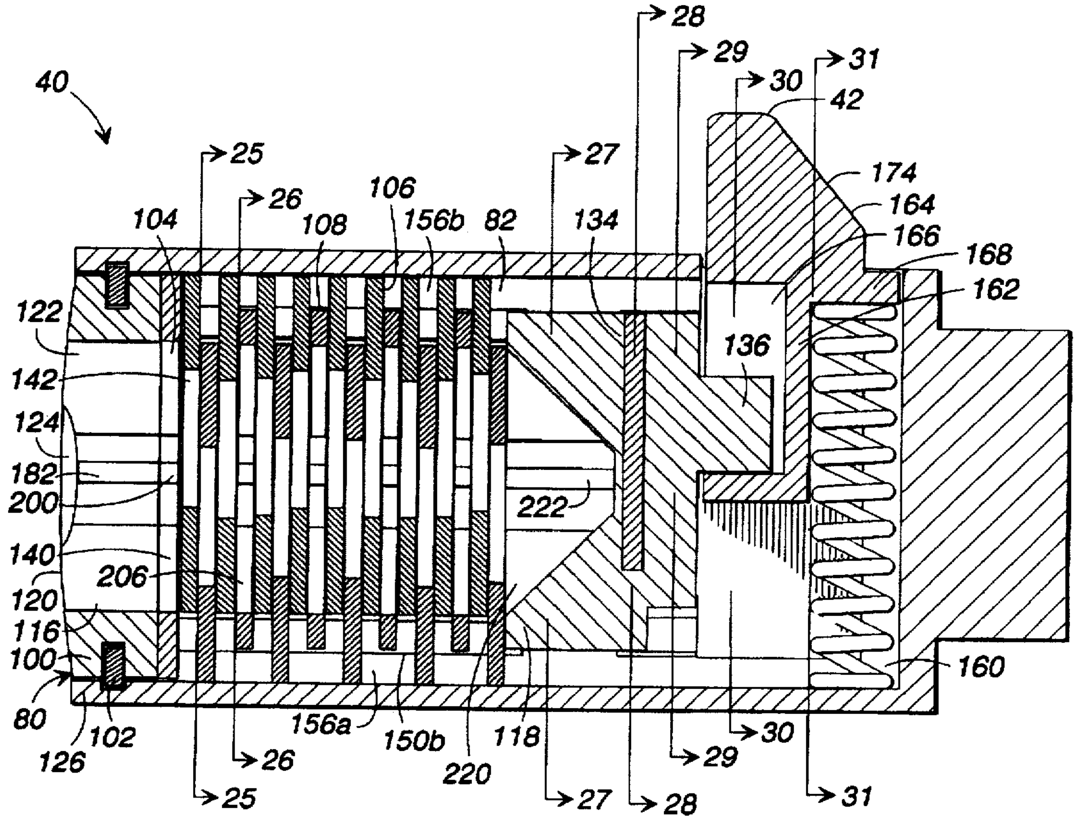
FIG. 21 is a side cross-sectional view of the cylinder lock taken along lines 19—19 of FIG. 5.
Figure 22:
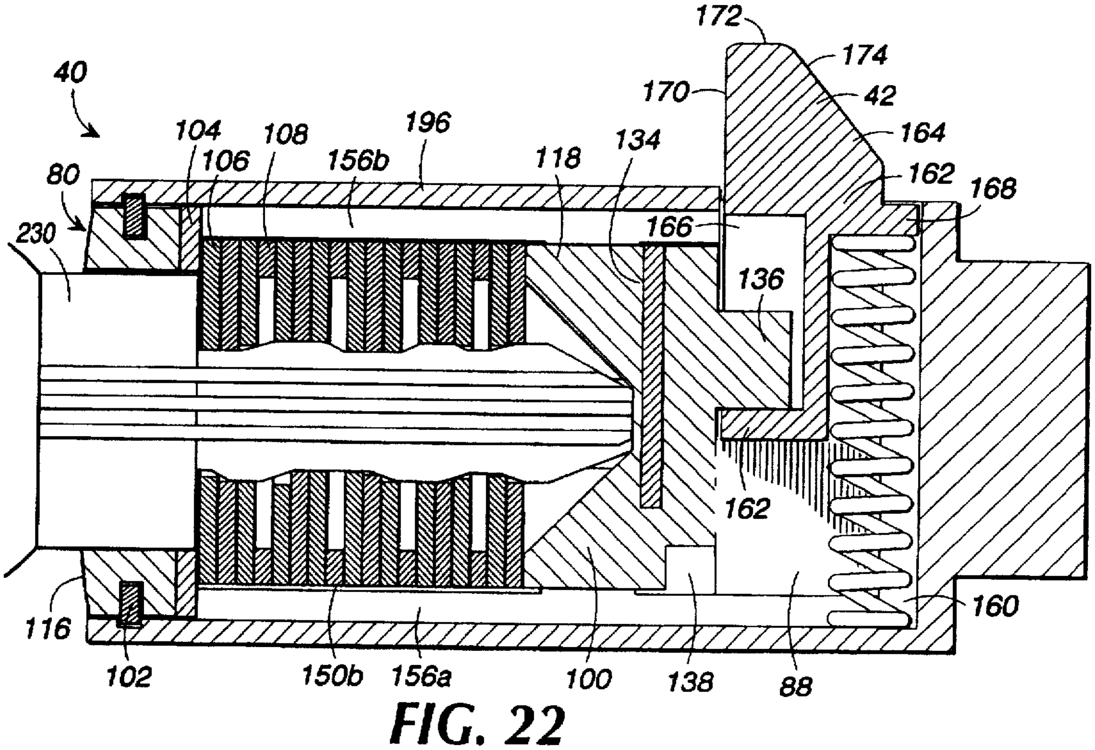
FIG. 22 is a side cross-sectional view of the cylinder lock similar to FIG. 2 shown with an inserted key.
Figure 23:
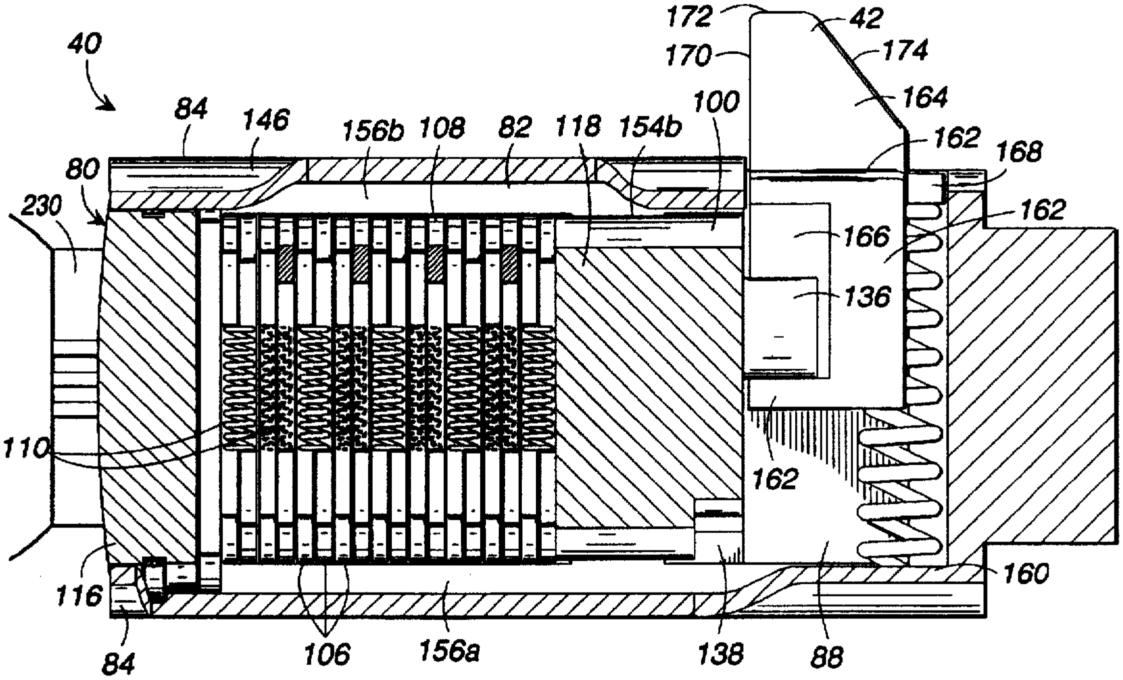
FIG. 23 is a side cross-sectional view of the cylinder lock similar to FIG. 20 shown with an inserted key.
Figure 24:
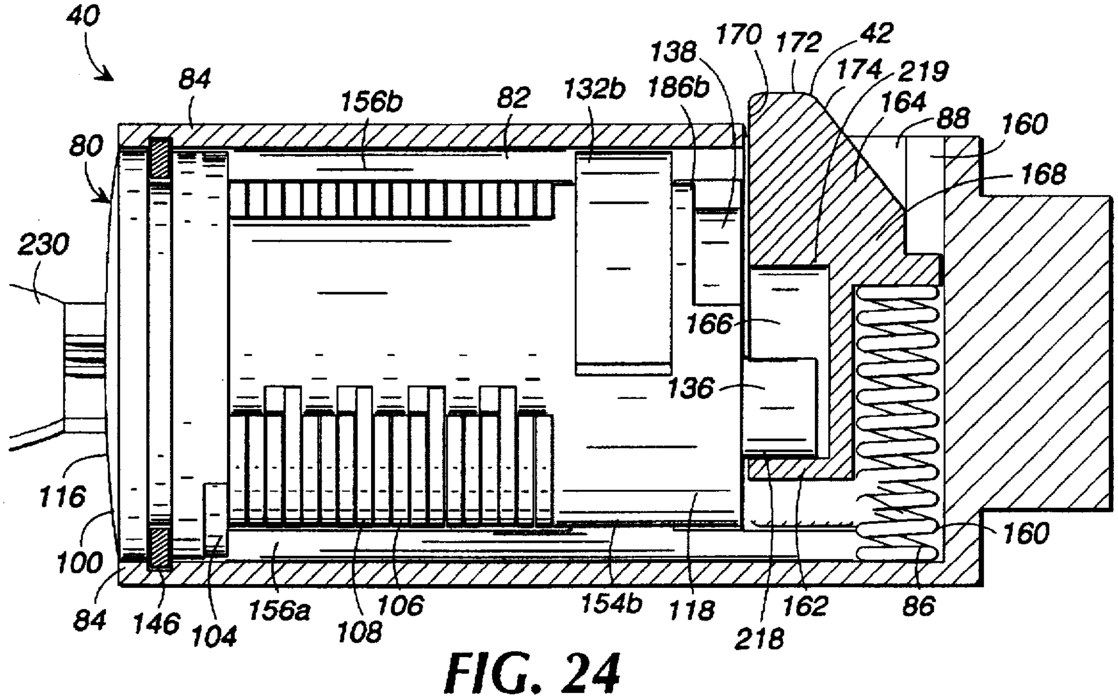
FIG. 24 is a side cross-sectional view of the cylinder lock similar to FIG. 19 shown with an inserted key and a rotated core assembly.

Refer now to FIG. 21 which shows a side cross-sectional view of the cylinder lock 40 again in the locked position taken along lines 19—19 of FIG. 5 with the core assembly 80 shown in cross-section. The head keyway 122 with an insert head tooth 182 is shown defined within the insert head 116 of the core insert 100. The head guide keyway 140 with a head guide tooth 200 of the head key guide 104 is shown following the insert head i 16. While the tumbler keyways 142 are shown with various shapes at different positions, the main guide keyways 206 follow the shape and placement of the head keyway 122. A rear body keyway 220 is also defined within the insert body 118 and includes several rear body teeth 222 matching the insert head teeth 182 and head guide teeth 200. FIG. 22 shows a view similar to FIG. 21 with a key 230 inserted into the core assembly 80 so that the tumblers 106 are aligned and retracted from the tumbler channels 156*a,b*. FIG. 23 shows the cylinder lock 40 in a view similar to that of FIG. 20 with the inserted key 230 revealing the compressed state of the springs 110. As the key 230 is rotated, the cylinder lock 40 appears as shown in FIG. 24 which shows a view similar to that of FIG. 19 with the key 230 inserted and rotated so that the cylinder lock 40 is unlocked. In this unlocked position, the lock bolt 42 is retracted into the radial aperture 88 as the stud 136 pushes the bolt cavity bottom surface 218 downward. While the extension top surface 172 of the lock bolt 42 still protrudes slightly from the housing 84, the retraction is adequate to permit axial movement between the T-handle 46 and T-handle housing 66 (FIG. 3) while preventing axial movement between the cylinder lock 40 and the T-handle 46 without manual depression of the lock bolt 42. While the stud will not reach a bolt cavity top surface 219 in the unlocked position, the lock bolt 42 will retract enough to allow the cylinder lock 40 to be removed from the T-handle 46.

Figure 25:
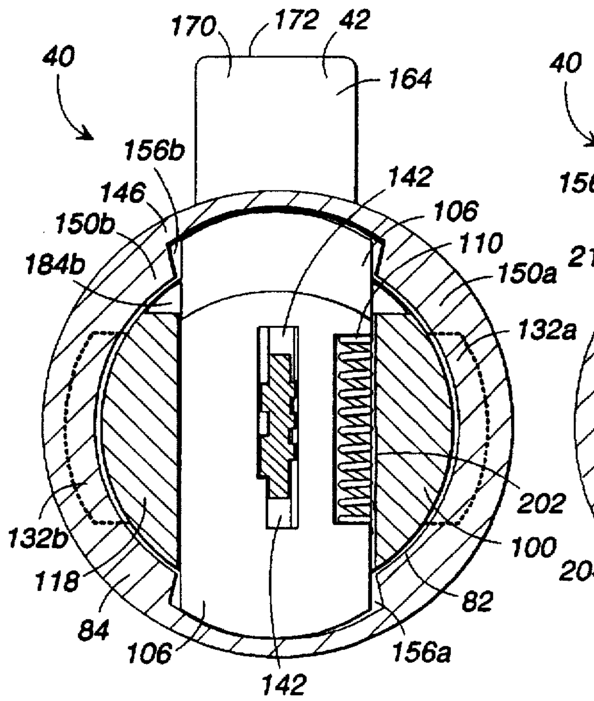
FIG. 25 is a front cross-sectional view of the cylinder lock taken along lines 25—25 of FIG. 21.
Figure 26:
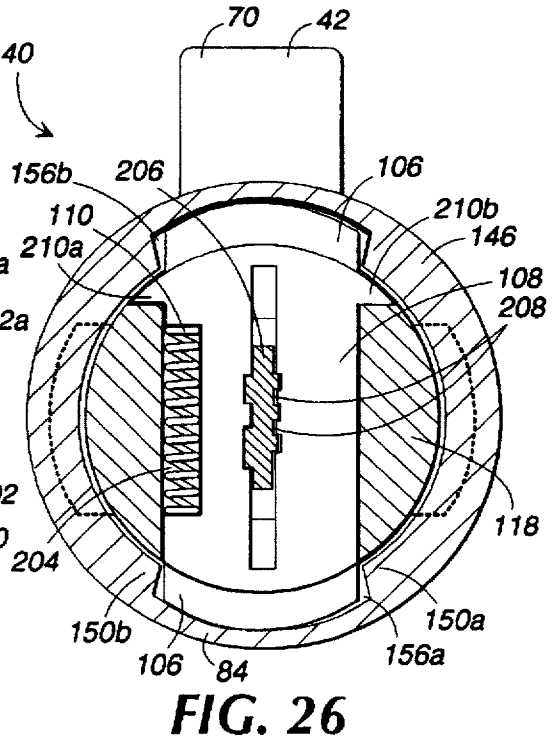
FIG. 26 is a front cross-sectional view of the cylinder lock taken along lines 26—26 of FIG. 21.
Figure 27:
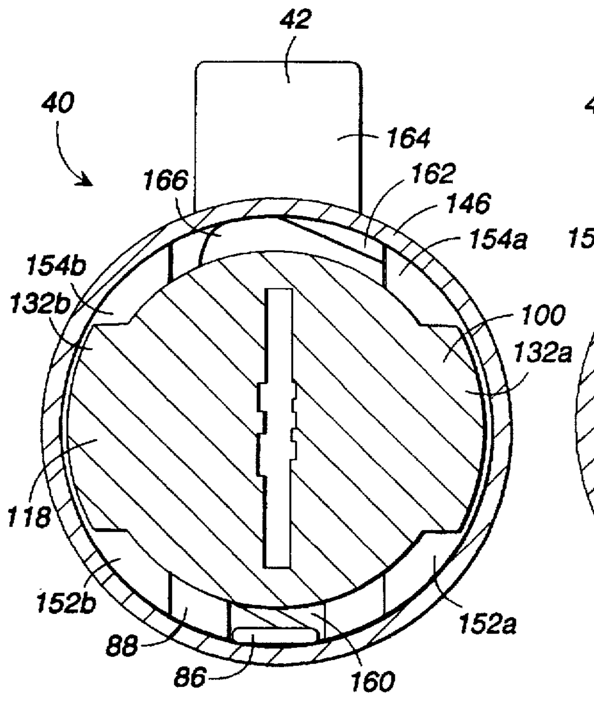
FIG. 27 is a front cross-sectional view of the cylinder lock taken along lines 27—27 of FIG. 21.
Figure 28:
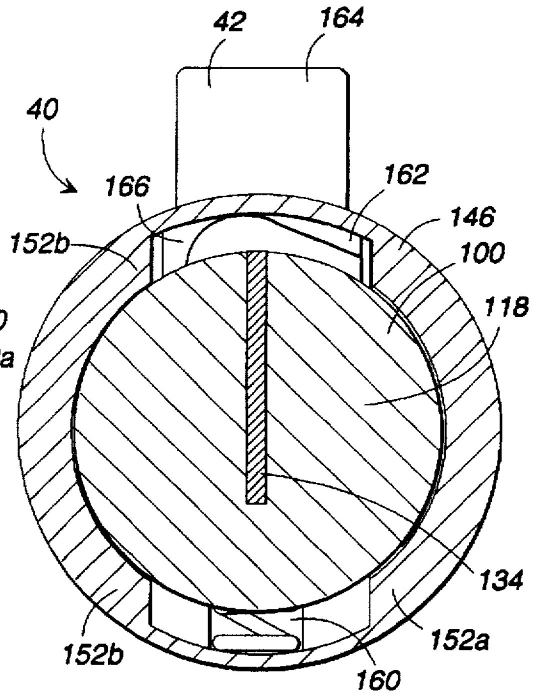
FIG. 28 is a front cross-sectional view of the cylinder lock taken along lines 28—28 of FIG. 21.
Figure 29:
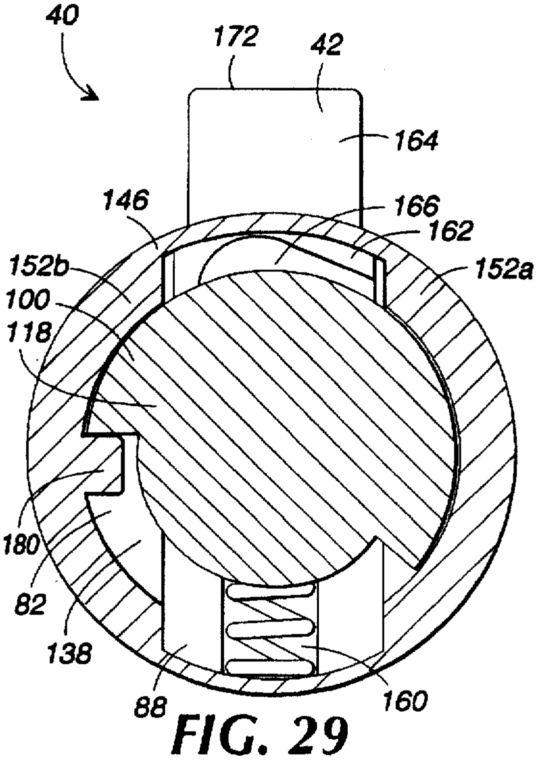
FIG. 29 is a front cross-sectional view of the cylinder lock taken along lines 29—29 of FIG. 21.
Figure 30:
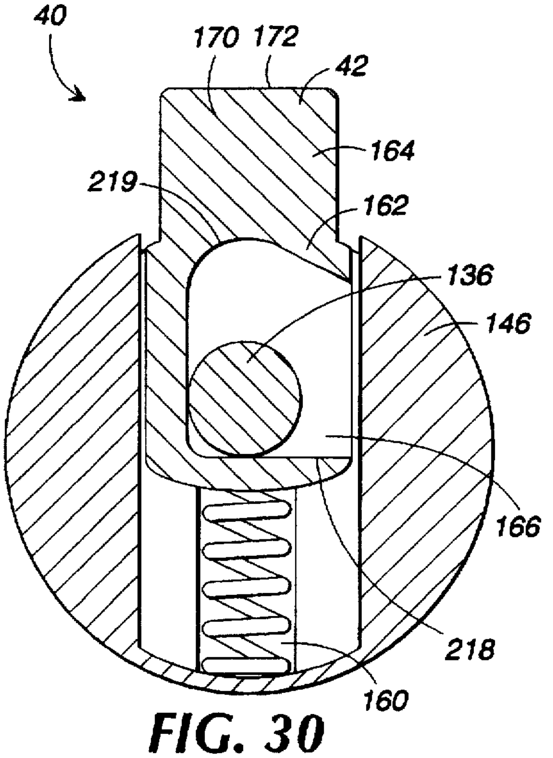
FIG. 30 is a front cross-sectional view of the cylinder lock taken along lines 30—30 of FIG. 21.
Figure 31:
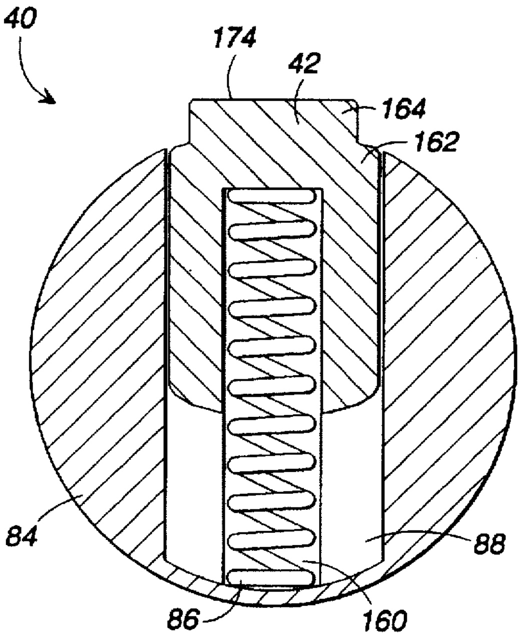
FIG. 31 is a front cross-sectional view of the cylinder lock taken along lines 31—31 of FIG. 21.

FIGS. 25–31 show front cross-sectional views of the cylinder lock 40 taken along respective lines of FIG. 21. FIG. 25 shows tumblers 106 biased against each other by the tumbler spring 110 to extend into the tumbler channels **156*a*, 156*b*. The wings 132*a,b*, shown in dotted lines, are located behind and abutting the forward lugs 150*a,b*. FIG. 26 is taken just in front of a main key guide 108 showing the guide arms 210*a,b* extending over the insert body 118. FIG. 27 is taken through the wings 132*a,b*, while FIG. 28 is taken through the deflection pin 134. FIG. 29 is taken through the rotation groove 138 showing interaction with the rotation stud 180. FIG. 30 is taken through the stud 136 to show the stud cavity 166. Finally, FIG. 31 reveals a cross-sectional view taken at a point down the extension rear face 174 of the lock bolt 42 showing the bolt spring 86**.

In addition, although not always indicated in the drawings, many edges of the elements of the cylinder lock 40 are rounded to avoid creation of stress concentration points. In particular, the leading and trailing edges of the wings **132*a,b* and the forward lugs 150*a,b*** are rounded. It should also be understood that other alternate embodiments of the present invention are included within the scope of the present invention. In such other alternate embodiments, the fortified wing system and/or the guide deflection system of the preferred embodiment of the present invention are used to increase the security of locks used in other environments besides vending machines where various types of cylinder locks have been used in the past. Furthermore, these systems can easily be incorporated into other types of locks subject to drilling or pulling. Thus, the present invention is intended to include other applications and embodiments of the fortified wing and guide deflection system.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

We claim:

1. A cylinder lock comprising:
 a hollow housing including
  a housing front,
  a housing rear,
  an elongated, generally cylindrical housing wall, said housing wall defining
   an axial housing cavity generally encircled by said housing wall, and
   a cylindrical axis extending through said housing cavity in an axial direction defined from said housing front to said housing rear, and
  a plurality of housing shoulders extending from said housing wall;
 a core assembly disposed within said housing cavity and rotatable about said axis relative to said housing, said core assembly including, at least,
  a generally cylindrical, exterior core wall, and
  a plurality of core protrusions each extending radially outward from said core wall defining a radial height and extending axially along said core wall defining an axial length,
   wherein said plurality of core protrusions abut said plurality of housing shoulders in a manner that seeks to preclude withdrawal of said core assembly from said housing,
   wherein said core wall includes a plurality of support surfaces, wherein each support surface of said plurality of support surfaces extends axially along said exterior core wall rearward from a corresponding core protrusion of said plurality of core protrusions to buttress said plurality of core protrusions; and
   wherein the combined axial length of each said support surface and said corresponding core protrusion is at least three times the radial height of said corresponding core protrusion; and
 a lock bolt cooperating with said core assembly and movable in response to rotation of said core assembly about said axis.

2. The cylinder lock of claim 1,
 wherein each core protrusion of said plurality of core protrusions extends at least twice as far axially as radially,
 wherein said housing wall further defines a radial aperture extending radially through said housing wall,
 wherein said lock bolt selectively protrudes radially from said radial aperture in response to rotation of said core assembly about said axis,
 wherein said housing further includes a plurality of lugs protruding radially from said housing wall, and said plurality of lugs define said plurality of housing shoulders,
 wherein said plurality of housing shoulders face rearward, and
 wherein said plurality of core protrusions define a plurality of forward facing protrusion shoulders for engaging said housing shoulders in a manner that seeks to preclude withdrawal of said core assembly from said housing cavity.

3. The cylinder lock of claim 1,
 wherein said housing wall further defines a radial aperture extending radially through said housing wall, and
 wherein said lock bolt selectively protrudes radially from said radial aperture in response to rotation of said core assembly about said axis.

4. The cylinder lock of claim 3,
 wherein said housing further includes a plurality of lugs protruding radially from said housing wall, and said plurality of lugs define said plurality of housing shoulders,
 wherein said plurality of housing shoulders face rearward, and
 wherein said plurality of core protrusions define a plurality of forward facing protrusion shoulders for engaging said housing shoulders in a manner that seeks to preclude withdrawal of said core assembly from said housing cavity.

5. The cylinder lock of claim 1, wherein each support surface of said plurality of support surfaces defines an axial surface length of greater than 0.25 mm.

6. The cylinder lock of claim 5, wherein said axial surface length of each support surface of said plurality of support surfaces is greater than 1.0 mm.

7. The cylinder lock of claim 6 wherein said housing further includes a plurality of lugs protruding radially inward from said housing wall, and said plurality of lugs define said plurality of housing shoulders, wherein said plurality of housing shoulders face rearward, and wherein said plurality of core protrusions define a plurality of forward facing protrusion shoulders for engaging said housing shoulders in a manner that seeks to preclude withdrawal of said core assembly from said housing cavity.

8. The cylinder lock of claim 1, wherein said plurality of core protrusions consists of a pair of core protrusions and said core protrusions are diametrically opposed, wherein said plurality of housing shoulders face rearward, and wherein each core protrusion of said pair of core protrusions defines a forward facing protrusion shoulder for engaging one of said housing shoulders in a manner that seeks to preclude withdrawal of said core assembly from said housing cavity.

9. The cylinder lock of claim 8, wherein said housing wall further defines a radial aperture extending radially through said housing wall, wherein said lock bolt selectively protrudes radially from said radial aperture in response to rotation of said core assembly about said axis.

10. The cylinder lock of claim 1, wherein said core assembly further includes a breaking means for contacting the shaft of a boring device in a manner that tends to break the shaft of the boring device when the boring device is bored generally axially into said core assembly, and a deflecting means for deflecting the shaft of the boring device into contact with said breaking means.

11. The cylinder lock of claim 1, wherein the combined axial length of each said support surface and said corresponding core protrusion is at least five times the radial height of said corresponding core protrusion.

12. The cylinder lock of claim 1, wherein said plurality of housing shoulders consists of a pair of housing shoulders, said plurality of core protrusions consists of a pair of core protrusions, and said plurality of support surfaces consists of a pair of support surfaces.

13. A cylinder lock comprising:

a hollow housing including a housing front, a housing rear, an elongated, generally cylindrical housing wall, said housing wall defining an axial housing cavity encircled by said housing wall, and a cylindrical axis extending through said housing cavity in a direction defined from said housing front to said housing rear, and a plurality of housing shoulders extending from said housing wall;

a core assembly disposed within said housing cavity and rotatable about said axis relative to said housing, said core assembly including, at least, a generally cylindrical, exterior core wall, and a plurality of core protrusions extending axially along and radially outward from said core wall, wherein said plurality of core protrusions abut said plurality of housing shoulders in a manner that seeks to preclude withdrawal of said core assembly from said housing, and wherein each core protrusion of said plurality of core protrusions extends at least three times as far axially as radially; and a lock bolt cooperating with said core assembly and movable in response to rotation of said core assembly about said axis.

14. The cylinder lock of claim 13, wherein said core protrusions extend more than 1.6 mm. axially, and wherein said core protrusions extend less than 1.0 mm. radially.

15. The cylinder lock of claim 13, wherein said core protrusions extend approximately 3.7 mm. axially, and wherein said core protrusions extend approximately 0.7 mm. radially.

16. The cylinder lock of claim 13, wherein said plurality of core protrusions include a first core protrusion and a second core protrusion, wherein said core wall defines a first support surface directly connected to and extending axially rearward of said first core protrusion to buttress said first core protrusion, and a second support surface directly connected to and extending axially rearward of said second core protrusion to buttress said second core protrusion.

17. The cylinder lock of claim 13, wherein said plurality of core protrusions define a plurality of forward facing protrusion shoulders for engaging said housing shoulders in a manner that seeks to preclude withdrawal of said core assembly from said housing cavity, wherein said housing wall further defines a radial aperture extending radially through said housing wall, and wherein said lock bolt selectively protrudes radially from said radial aperture in response to rotation of said core assembly about said axis.

18. The cylinder lock of claim 13,wherein said core assembly further includes, at least, a breaking means for contacting the shaft of a boring device in a manner that tends to break the shaft of the boring device when the boring device is bored generally axially into said core assembly, and a deflecting means for deflecting the shaft of the boring device into contact with said breaking means to promote breakage of the shaft of the boring device.

19. The cylinder lock of claim 13, wherein each core protrusion of said plurality of core protrusions extends at least five times as far axially as radially.

20. The cylinder lock of claim 13, wherein said plurality of housing shoulders consists of a pair of housing shoulders, and said plurality of core protrusions consists of a pair of core protrusions.

21. A cylinder lock for use with a key and resistive to the boring of an elongated boring device into the cylinder lock, the cylinder lock comprising:

a hollow housing including a housing front, a housing rear, and an elongated, generally cylindrical housing wall, said housing wall defining an axial housing cavity encircled by said housing wall, and a cylindrical axis extending through said housing cavity in a direction defined from said housing front to said housing rear; and a core assembly disposed within said housing cavity and rotatable about said axis relative to said housing cavity said core assembly including a breaking means for contacting the shaft of the boring device in a manner that tends to break the shaft of the boring device, a deflecting means for deflecting the shaft of the boring device into contact with said breaking means in a manner that promotes breakage of the shaft of the boring device, a core front, and a core rear, wherein said core assembly defines an entry passage at said core front for receiving the key, and a tumbler chamber rearward of said core front and in communication with said entry passage, wherein said breaking means is disposed within said tumbler chamber, and wherein said deflecting means is rearward of said tumbler chamber.

22. The cylinder lock of claim 21, wherein said breaking means includes a hardened key guide disposed within said tumbler chamber, said hardened key guide including a breaking surface for contacting the shaft of the boring device in a manner that tends to break the shaft of the boring device, said breaking surface at least partially bounding a keyway passage defined through said hardened key guide.

23. The cylinder lock of claim 22, wherein said deflecting means is a radially extending, hardened pin disposed within said core assembly at a position rearward of said hardened key guide.

24. The cylinder lock of claim 22,wherein said hardened key guide is stainless steel.

25. The cylinder lock of claim 22, wherein said core assembly further includes an eccentric post connected to and extending rearward from said core rear, and wherein said deflecting means further deflects the boring device away from said eccentric post.

26. The cylinder lock of claim 22, wherein said hardened key guide is generally stationary with respect to said core assembly, and wherein said breaking surface defines teeth for contacting the shaft of the boring device in a manner that tends to break the shaft of the boring device.

27. The cylinder lock of claim 26, wherein said deflecting means is a radially extending, hardened pin disposed within said core assembly at a position rearward of said hardened key guide.

28. The cylinder lock of claim 26, wherein said housing further includes a plurality of housing shoulders extending into said housing cavity from said housing wall, wherein said core assembly further includes a plurality of core protrusions extending outward from said core wall, wherein said plurality of core protrusions abut said plurality of housing shoulders in a manner that seeks to preclude withdrawal of said core assembly from said housing, and wherein each core protrusion of said plurality of core protrusions extends at least twice as far axially as radially, and wherein said core wall defines a first support surface directly connected to and extending axially rearward of said first core protrusion to buttress said first core protrusion, and a second support surface directly connected to and extending axially rearward of said second core protrusion to buttress said second core protrusion.

29. A core assembly for use as part of a cylinder lock, said core assembly comprising:

an elongated, generally cylindrical, exterior core wall; and a plurality of core protrusions each extending radially outward from said core wall defining a radial height and extending axially along said core wall defining an axial length, wherein said core wall includes a plurality of support surfaces, wherein each support surface of said plurality of support surfaces extends axially along said exterior core wall rearward from a corresponding core protrusion of said plurality of core protrusions to buttress said plurality of core protrusions, and wherein the combined axial length of each said support surface and said corresponding core protrusion is at least three times the radial height of said corresponding core protrusion.

30. The core assembly of claim 29, wherein each core protrusion of said plurality of core protrusions extends at least twice as far axially as radially.

31. The cylinder lock of claim 29, wherein said plurality of core protrusions consists of a pair of core protrusions, and said plurality of support surfaces consists of a pair of support surfaces.

32. The core assembly of claim 29, wherein each support surface of said plurality of support surfaces defines an axial surface length of greater than 0.25 mm.

33. The core assembly of claim 32 wherein said axial surface length of each support surface of said plurality of support surfaces is greater than 1.0 mm.

34. The core assembly of claim 29, further comprising:

a breaking means for contacting the shaft of a boring device in a manner that tends to break the shaft of the boring device when the boring device is bored generally axially into said core assembly; and a deflecting means for deflecting the shaft of the boring device into contact with said breaking means.

35. The cylinder lock of claim 29, wherein the combined axial length of each said support surface and said corresponding core protrusion is at least five times the radial height of said corresponding core protrusion.

36. A core assembly for use as part of a cylinder lock, said core assembly comprising:

an elongated generally cylindrical, exterior core wall; and a plurality of core protrusions extending axially along and radially outward from said core wall;

wherein each core protrusion of said plurality of core protrusions extends at least three times as far axially as radially.

37. The core assembly of claim 36, wherein said core protrusions extend more than 1.6 mm. axially, and wherein said core protrusions extend less than 1.0 mm. radially.

38. The core assembly of claim 36, wherein said core protrusions extend approximately 3.7 mm. axially, and wherein said core protrusions extend approximately 0.7 mm. radially.

39. The core assembly of claim 36, wherein said plurality of core protrusions consists of a pair of core protrusions.

40. The core assembly of claim 36, wherein said plurality of core protrusions include a first core protrusion and a second core protrusion, wherein said core wall defines a first support surface extending axially rearward of said first core protrusion to buttress said first core protrusion, and a second support surface extending axially rearward of said second core protrusion to buttress said second core protrusion.

41. The core assembly of claim 36, wherein each core protrusion of said plurality of core protrusions extends at least five times as far axially as radially.

42. The core assembly of claim 36, further comprising:

a breaking means for contacting the shaft of a boring device in a manner that tends to break the shaft of the boring device when the boring device is bored generally axially into said core assembly, and a deflecting means for deflecting the shaft of the boring device into contact with said breaking means to promote breakage of the shaft of the boring device.

43. A core assembly for use as part of a cylinder lock resistive to the boring of an elongated boring device, the core assembly comprising:

a core front; and a core rear, wherein said core assembly defines an entry passage at said core front for receiving a key, and a tumbler chamber rearward of said core front and in communication with said entry passage, a breaking means for contacting the shaft of the boring device in a manner that tends to break the shaft of the boring device;

a deflecting means for deflecting the shaft of the boring device into contact with said breaking means in a manner that promotes breakage of the shaft of the boring device;

wherein said breaking means is disposed within said tumbler chamber, and wherein said deflecting means is rearward of said tumbler chamber.

44. The core assembly of claim 43, wherein said breaking means includes a hardened key guide disposed within said tumbler chamber, said hardened key guide including a breaking surface for contacting the shaft of the boring device in a manner that tends to break the shaft of the boring device, said breaking surface at least partially bounding a keyway passage defined through said hardened key guide.

45. The core assembly of claim 44, wherein said deflecting means is a radially extending, hardened pin disposed within said core assembly at a position rearward of said hardened key guide.

46. The core assembly of claim 44, wherein said hardened key guide is stainless steel.

47. The core assembly of claim 44, wherein said core assembly further includes an eccentric post connected to and extending rearward from said core rear, and wherein said deflecting means further deflects the boring device away from said eccentric post.

48. The core assembly of claim 44, wherein said hardened key guide is generally stationary with respect to said core assembly, and wherein said breaking surface defines teeth for contacting the shaft of the boring device in a manner that tends to break the shaft of the boring device.

49. The core assembly of claim 48, wherein said deflecting means is a radially extending, hardened pin disposed within said core assembly at a position rearward of said hardened key guide.

50. The core assembly of claim 48, further comprising:

an exterior core wall; and a plurality of core protrusions extending outward from said core wall, wherein each core protrusion of said plurality of core protrusions extends at least twice as far axially as radially, and wherein said core wall defines a first support surface extending axially rearward of said first core protrusion to buttress said first core protrusion, and a second support surface extending axially rearward of said second core protrusion to buttress said second core protrusion.

51. A cylinder lock comprising:

a hollow housing including a housing front, a housing rear, an elongated, generally cylindrical housing wall, said housing wall defining an axial housing cavity generally encircled by said housing wall, and a cylindrical axis extending through said housing cavity in an axial direction defined from said housing front to said housing rear, and at least one of housing shoulder extending from said housing wall;

a core assembly disposed within said housing cavity and rotatable about said axis relative to said housing, said core assembly including, at least, a generally cylindrical, exterior core wall, and at least one core protrusion extending radially outward from said core wall defining a radial height and extending axially along said core eight and extending axially along said core wall defining an axial length, wherein said core protrusion abuts said housing shoulder in a manner that seeks to preclude withdrawal of said core assembly from said housing, wherein said core wall includes at least one support surface, wherein said support surface extends axially along said exterior core wall rearward from said core protrusion to buttress said core protrusion; and wherein the combined axial length of said support surface and said core protrusion is at least three times the radial height of said core protrusion; and a lock bolt cooperating with said core assembly and movable in response to rotation of said core assembly about said axis.

52. The cylinder lock of claim 51, wherein said housing wall further defines a radial aperture extending radially through said housing wall, and wherein said lock bolt selectively protrudes radially from said radial aperture in response to rotation of said core assembly about said axis.

53. The cylinder lock of claim 51 wherein a passage is defined at said housing front whereby access is had to said housing cavity, and said housing includes a rear wall at said housing rear whereby the housing cavity has no rear access.

54. A cylinder lock comprising:

a hollow housing including a housing front, a housing rear, an elongated, generally cylindrical housing wall, said housing wall defining an axial housing cavity encircled by said housing wall, and a cylindrical axis extending through said housing cavity in a direction defined from said housing front to said housing rear, and at least one of housing shoulder extending from said housing wall;

a core assembly disposed within said housing cavity and rotatable about said axis relative to said housing, said core assembly including, at least, a generally cylindrical, exterior core wall, and at least one core protrusion extending axially along and radially outward from said core wall, wherein said core protrusion abuts said housing shoulder in a manner that seeks to preclude withdrawal of said core assembly from said housing, and wherein said core protrusion extends at least three times as far axially as radially, and a lock bolt cooperating with said core assembly and movable in response to rotation of said core assembly about said axis.

55. The cylinder lock of claim 54, wherein said housing wall further defines a radial aperture extending radially through said housing wall, and wherein said lock bolt selectively protrudes radially from said radial aperture in response to rotation of said core assembly about said axis.

56. The cylinder lock of claim 54, wherein a passage is defined at said housing front whereby access is had to said housing cavity, and said housing includes a rear wall at said housing rear whereby the housing cavity has no rear access.

* * * * *